United States Patent

[11] 3,626,106

[72] Inventors Clarence A. Greening; Billy G. Grimsley, both of Farmington, N. Mex.
[21] Appl. No. 853,307
[22] Filed Aug. 27, 1969
[45] Patented Dec. 7, 1971
[73] Assignees Clarence A. Greening; Billy G. Grimsley Farmington, N. Mex.

[54] APPARATUS AND METHOD FOR THE SELECTIVE RINGING OF TELEPHONES
16 Claims, 12 Drawing Figs.

[52] U.S. Cl. .... 179/18 AD, 179/84 SS
[51] Int. Cl. .... H04m 1/26
[50] Field of Search .... 179/84 SS, 18 AD, 2.5, 41 A, 17

[56] References Cited

UNITED STATES PATENTS

| | | | |
|---|---|---|---|
| 2,857,464 | 10/1958 | Singer | 179/2.5 X |
| 2,907,832 | 10/1959 | Boswau et al. | 179/18 P & I X |
| 3,450,845 | 6/1969 | Morse | 179/84 SS |

*Primary Examiner*—Kathleen H. Claffy
*Assistant Examiner*—William A. Helvestine
*Attorney*—Van Valkenburgh and Lowe ABSTRACT: A selective ringing apparatus for a multiextension telephone system on a common carrier drop either as a point to point or a part line system. Seizure of the apparatus by a central control locks and conditions the same to receive a sequence of two dial digit pulse trains for ringing a selected extension. The first pulse train is directed into a selector having a distributor gate for each group of dial pulses which may occur in the first dial digit. The second pulse train is directed into one of a group of selectors, a selector for each distributor gate, and each has a distributor gate for each group of dial pulses which may occur in the second dial digit. Locking circuits select and hold these selectors to permit the ringing apparatus to ring a selected telephone extension. The apparatus can also be locked out if a local telephone seizes the line. Various other features include the use of wire line arrangements to selectively ring remotely located telephone extensions and a complimentary bridging board for use when the extensions are arranged as a party line circuit to permit selective dialing by a local extension to either the remote central control panel or to another extension within the system.

LEGEND

—×— Contact Normally Open

—|— Contact Normally Closed

INVENTORS
Clarence A. Greening
Billy G. Grimsley
BY
Van Valkenburgh & Lowe
ATTORNEYS INVENTORS
Clarence A. Greening
Billy G. Grimsley
BY Van Valkenburgh & Lowe
ATTORNEYS INVENTORS
Clarence A. Greening
Billy G. Grimsley
BY
Van Valkenburgh & Lowe
ATTORNEYS INVENTORS
Clarence A. Greening
Billy G. Grimsley BY Van Valkenburgh & Lowe

ATTORNEYS

INVENTORS
Clarence A. Greening
Billy G. Grimsley
BY Van Valkenburgh & Lowe
ATTORNEYS INVENTORS
Clarence A. Greening
Billy G. Grimsley
BY
Van Valkenburgh & Lowe
ATTORNEYS INVENTORS
Clarence A. Greening
Billy G. Grimsley
BY Van Valkenburgh & Lowe
ATTORNEYS

APPARATUS AND METHOD FOR THE SELECTIVE RINGING OF TELEPHONES

As used herein the terms "carrier," "common carrier" and "carrier circuit" mean a circuit carrying signals, which may be a wire circuit, microwaves or the like. The term "carrier drop" is intended to means the connection of telephone instruments to the carrier circuit at a particular location.

This invention relates to apparatus and methods for ringing an individual telephone connected in parallel with a group of telephones on a single carrier drop, as in a point to point or in a party line telephone system. As such, the invention will be called an apparatus and method for the selective ringing of telephones.

A primary object of the invention is to provide an apparatus and method for ringing a selected telephone extension on a common carrier drop which effects the selection of the extension with a standard telephone dial.

Another object of the invention is to provide a novel and improved selective ringing apparatus and method which is capable of ringing 80, and even as many as 100 telephone extensions connected to a single carrier drop by the simple procedure of dialing two digits into the apparatus.

Another object of the invention is to provide a novel and improved selective ringing apparatus and method for use with a point to point or party line telephone system which may be connected with a PBX-board or where an operator may dial a selected extension on the carrier drop, or which may be interconnected to a regular telephone system to receive incoming calls directly providing that the last two dialing digits dialed by the incoming caller are reserved for the extensions on the carrier drop.

Another object of the invention is to provide, in a selective ringing apparatus having a party line arrangement with several stations and a substantial number of extensions at the stations, a novel and improved construction of a bridging control which permits a party in the system to place an outgoing call, as through a PBX, or to dial an extension at another station without going through the PBX, all by simple, direct dialing operations.

Another object of the invention is to provide a novel and improved selective ringing apparatus for a single carrier drop having a large number of extensions, which is an economical, neatly arranged, compact array of solid-state components, with the apparatus using a minimum number of mechanical relays and relay switches.

Further objects of the invention are to provide, in a novel and improved, compact solid-state selective ringing apparatus, any of several various features considered necessary to render the apparatus usable under all circumstances, including means for locking out the ringing apparatus when an extension is in use; a means for providing exclusive use of one extension on the carrier drop; a means for warning the operator if an extension telephone is accidentally left off its hook; and arrangements to permit the ringing of extensions at remote locations.

With the foregoing and other objects in view, my invention comprises certain constructions, combinations and arrangements of parts and elements capable of operation in selected sequences and steps as hereinafter described, defined in the appended claims and set forth in the accompanying drawings in which:

Usually, party line communication systems are limited to six, eight and at the most, 10 extension telephones connected in parallel on a common carrier drop. The telephones of such a party line system may be rung individually by various ringing mechanisms, but such mechanisms are limited as to the number of telephones they can ring or they become very complex whenever the number of telephone extensions on the party line are increased. However, with the increased development of widespread industrial groups, there is an ever increasing need for point to point or party line systems having a large number of telephone extensions on the common carrier drop, far in excess of the number which can be accommodated by present types of conventional selective ringing mechanisms for party line equipment.

The present invention was conceived and developed with such a need in view and comprises, in essence, a selective ringing unit which may be used with a point to point or a party line system which may have, as a maximum, 100 telephone extensions on a common carrier drop. The selective ringing unit is operated by standard dialing equipment and by dialing two digits it may ring, as a maximum, any one of 100 telephone extensions although it is preferable to limit the number to 80 extensions to avoid using one-pulse digits and to permit the 10-pulse (0) dial digits to be assigned to a central station or PBX. This improved selective ringing unit is built as a simple, compact arrangement of solid-state components and of integrated circuits of solid-state components using only a minimum of mechanical relays as at the ringing stations and at the carrier panel of the system.

Figure 1:
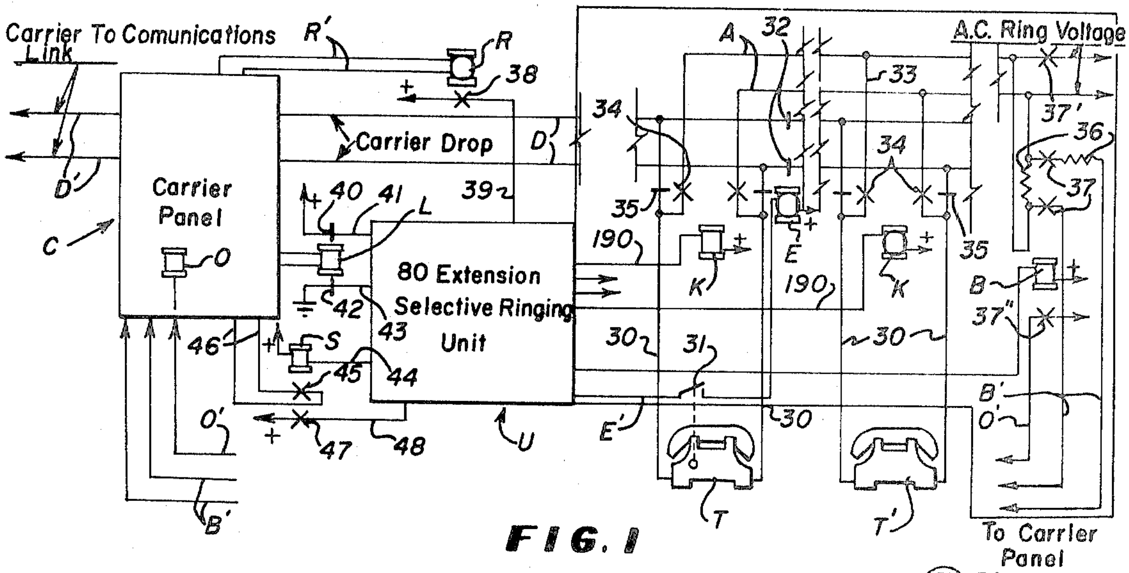
FIG. 1 is a block circuit diagram depicting generally, representative portions of a multiple extension telephone system on a single carrier drop, with the improved selective ringing apparatus being incorporated therein.

Referring more particularly to the drawing, FIG. 1 illustrates selected portions of a carrier drop connecting into a carrier panel C to provide either a party line or a point to point system. The wires forming a carrier drop D extend from this carrier panel to connect with the leads 30 of the telephone extensions on the carrier drop, two telephones being shown at FIG. 1 as T and T'. The carrier drop extending into the carrier panel C connects with leads D' which extend through the carrier panel to a communications carrier link, not shown. An incoming call to a selected extension is dialed by an operator at a PBX-board or at another station in the system or directly through a telephone system connecting with the leads D', and the dial pulses are directed into the carrier panel C as hereinafter described.

Any one telephone T of the group of extensions, preferably the first on the drop, may include a normally open exclusion switch 31 of an exclusion lead E' connecting with an exclusion relay E. This relay E is adapted to open normally closed relay switches 32 in the carrier drop and to close other normally open switches, hereinafter described, to cut other telephones off the line which are located on the carrier drop beyond the switches 32.

A pair of leads A are connected to an alternating current ringing voltage for ringing the phone extensions. The ring voltage leads A are connected, as by parallel leads 33, to normally open contacts 34 of relays K associated with each telephone. The K relays switch the telephones through the leads 30. Each relay K operates a normally open switch 34 in each extension A and a normally closed switch 35 in each lead 30 adjacent to the carrier drop. When a relay K is energized to close switches 34 and open switches 35, the ringing voltage on leads A is connected to the telephone through leads 30. At the same time, the carrier drop leads are disconnected from the telephone. A ringing of a selected extension is thus affected by cyclic operation of a relay B at 3-second intervals or any similar time period, through operation of circuits in the selective ringing unit U, as hereinafter described.

The system also includes circuitry connecting a ringback voltage to the leads D so that the ringing signal may be heard on the distant telephone from whence an incoming call is being made. The ringback circuit includes a pair of leads B′ connected to the ringing leads A with resistors 36 to reduce the voltage on the leads B′. These leads B′ extend to the carrier panel C and connect with the carrier drop D in a manner, not shown. A normally open switch 37 is provided in each lead B′, and these switches are operated by the relay coil B which effects ringing when a pair of switches 34 are closed. Another normally open switch 37′ in a ring voltage lead A and a fourth normally open switch 37″ in a control lead 0′ are also operated by the relay B. The switch 37′ effects ringing when a pair of switches 34 are closed. The switch 37″ energizes a relay 0 in the carrier panel to close circuits in this panel which are not directly connected with the selective ringing system and thus, need not be further described.

The selective ringing unit, though not connected directly to the carrier drop, is operative to respond to electrical pulses imposed at the carrier panel through the drop D′ from a PBX-board or commercial system as when a remote telephone is dialing one of the extensions. Whenever a remote telephone, or the operator at a PBX-board seizes the circuit for an incoming call, a relay R is energized. Dialing at the remote telephone will produce dial pulse trains, with each pulse deenergizing and energizing the relay R in a conventional manner not shown. The relay R is normally within the carrier C, but is shown at FIG. 1 extending therefrom as by leads R′ to better illustrate its connection with the selective ringing unit U. The energizing of relay R closes a switch 38 and the pulses created by momentarily deenergizing and energizing relay R, momentarily open a normally open switch 38 which is in a lead 39 extending into the selective ringing unit.

An outgoing call from the system is initiated whenever a telephone on the carrier drop is lifted off its hook. This connects the telephone circuit leads 30 into the carrier drop D, through the carrier panel C and through the prime communications link which is illustrated as wire line leads D′, but which may be a microwave or a radio frequency signal as well as a wire lead. At the same time, this action energizes a relay L within the carrier panel and connected to the carrier drop in a manner, not shown. When the relay L is energized, it acts to open a normally closed switch 40 in an energized lead 41 extending into the selective ringing unit, and to open a normally closed switch 42 in a grounded lead 43 also extending into the selective ringing unit. The lead 41 is to initiate the operations of a timing device which will sound an alarm if the telephone remains off the hook for an excessive length of time and the lead 43 is effective to lock out the selective ringing unit against a possible incoming call as will be described.

A relay S shown as being outside the carrier panel but actually being within the panel, is provided which is operated by controls within the selective ringing unit and is energized whenever the selective ringing unit is locked, through lead 43, as when a telephone within the system is lifted. This relay S is carried on a circuit 44 in the selective ringing unit and operates to close a normally open switch 45 in a circuit 46 extending into the carrier panel and a second switch 47 in a circuit 48 extending to a timer in the selective ringing unit U as hereinafter further described.

Figure 2:
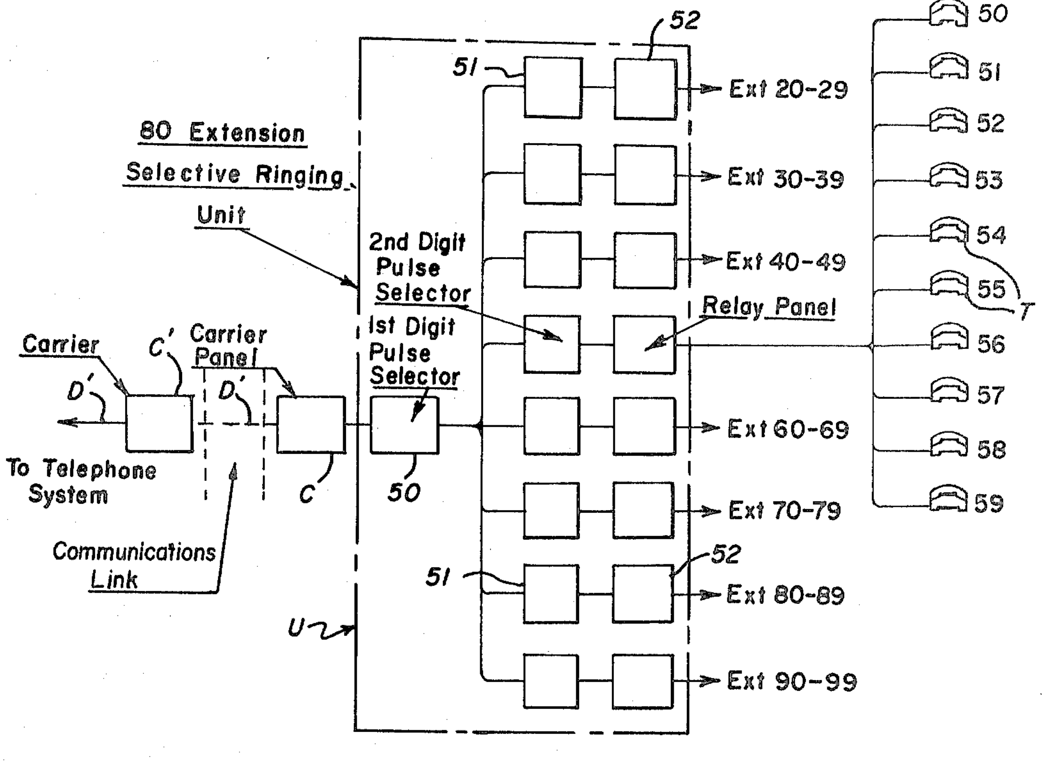
FIG. 2 is a block diagram of the selective ringing unit, with the components thereof being arranged for connection with 80 extensions as in a point to point system.

The block diagram at FIG. 2 depicts an 80-extension, point to point arrangement of the selective ringing unit U connected into the carrier C, illustrating the detail somewhat differently from that shown at FIG. 1. This unit U is connected to the carrier panel C as hereinbefore described and the carrier drop D′ is indicated as extending through a communications link to another carrier C′ and thence to a telephone system. The components within the selective ringing unit will categorically include a first digit pulse selector 50 which connects with 8-second digit pulse selectors 51, although this number may be increased to 10. The seizure of the carrier by a remote telephone on an incoming call will close switch 38 and thereafter the pulse train of the first telephone dial digit will cause the first pulse selector 50 to select one of the 8-second pulse selectors 51 to respond to and receive further dialing, to ultimately ring a telephone extension associated with the selected second digit pulse selector 51.

Each second digit pulse selector 51 includes an associated relay panel 52 which will connect with as many as 10 telephone T extensions, as illustrated, to effect ringing of any one of the extensions. Certain components in each relay panel 52 have been described in connection with FIG. 1. For example, each relay panel 52 includes, in addition to other components hereinafter described, a portion of the carrier drop D, the ringing voltage leads A, portions of the leads and switches 30 through 37 heretofore described, as well as the relays E, K and B.

Figure 3:
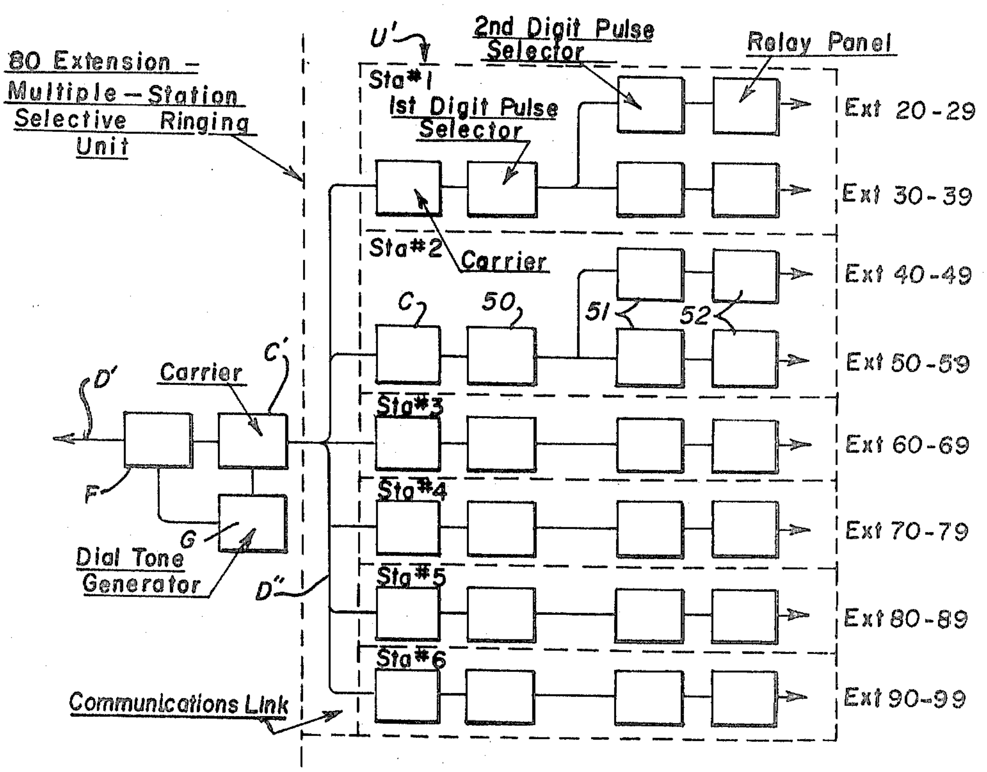
FIG. 3 is a block diagram of the selective ringing unit similar to FIG. 2, but with the components thereof being arranged for connection with 80 extensions at six individual stations as in a party line system.

The block diagram at FIG. 3 depicts an 80-extension party line system, another arrangement of a selective ringing unit U′. In this arrangement the carrier drop D is necessarily branched into several stations because of the distance between various groups of telephone extensions. When so divided, as into the six stations illustrated, there is a duplication of carriers C and of first digit pulse selectors 50, one of each being required at each station. For example, at FIG. 3, Stations 1 and 2 are shown as each having 20 extensions while the remaining stations are illustrated as each having 10 extensions. This branching of the carrier is quite practical because each selector 50 and carrier C are not expensive and the total cost for such duplication of components is not excessive compared with the benefit to be gained by its use.

To provide selective ringing for a total of 80 extensions, 8-second digit pulse selectors 51 will be required. When more than one first digit pulse selector 50 is used as at FIG. 3, not all of the outlets at each selector 50 are connected with second digit pulse selectors 51. However, all carriers C and selectors 50 will operate in unison and thus, as a group they will produce the same overall effect as if only a single carrier C and a single selector 50 were used in the system.

All of the carriers C are brought together by a common carrier drop D″ which may be at a commercial link and which, in turn, are connected to another carrier C′. A carrier drop D′ extends from the carrier C′ and to a PBX-board or to a commercial telephone system. In this arrangement, however, it is desirable to provide for a dial tone generator G and a bridging panel F in the carrier drop D′ to prevent unnecessary connections to the telephone system outside the selective ringing unit U, as will be hereinafter described.

Figure 4:
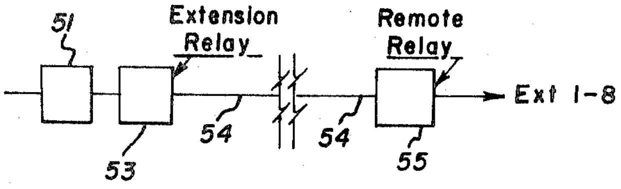
FIG. 4 is a block circuit diagram of a fragment of the diagrams at FIG. 2, or FIG. 3, and a further extension thereof to provide for selective ringing of telephone extensions beyond the normal reach of the arrangements depicted at FIGS. 2 and 3.

FIG. 4 illustrates, diagrammatically, one manner of providing for ringing extensions which are too distant for convenient connection directly into a relay panel 52. A second digit pulse selector 51, in the arrangement shown at either FIG. 2 or FIG. 3, is connected with an extension relay panel 53 which connects by wire line leads 54 to a remote relay panel 55, and thence to as many as eight telephone extensions. It is to be noted that while the second digit pulse selector 51 can select 10 extensions, the remote relay 55 can select only eight extensions, as will be hereinafter explained in detail.

Figure 5:
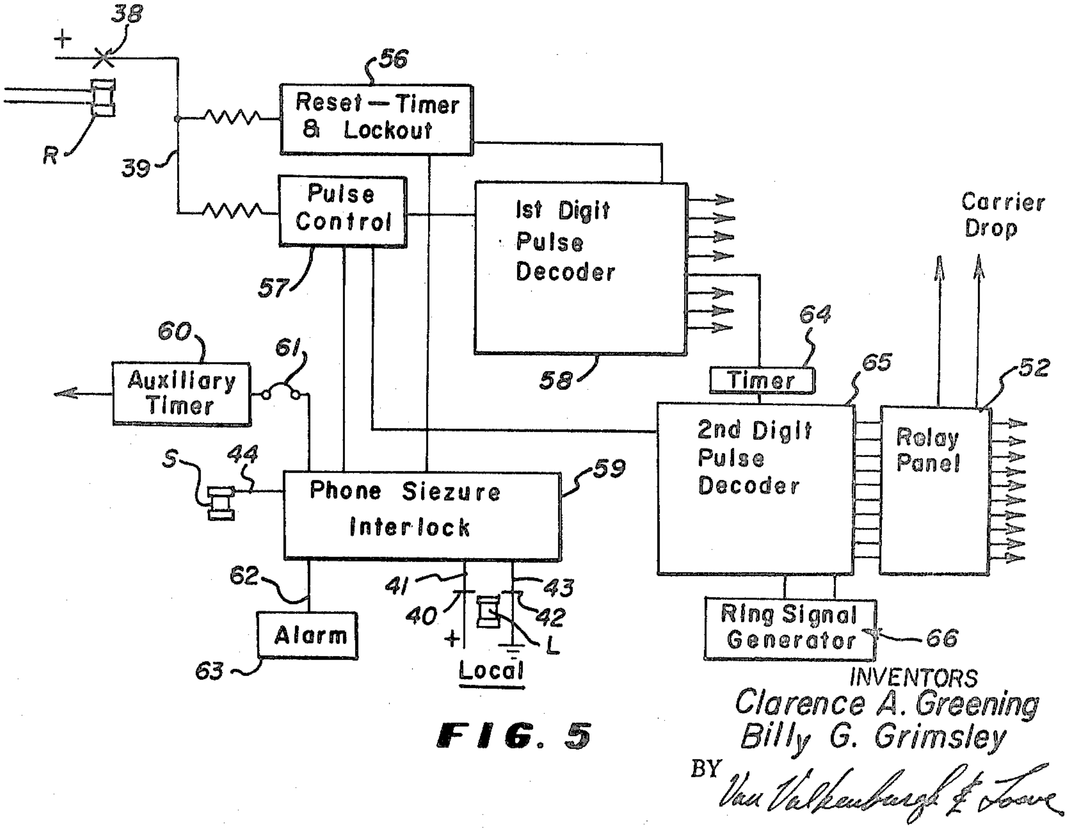
FIG. 5 is a functional block diagram of portions of the selective ringing unit depicted at FIGS. 1, 2 and 3.
Figures 11, 12:
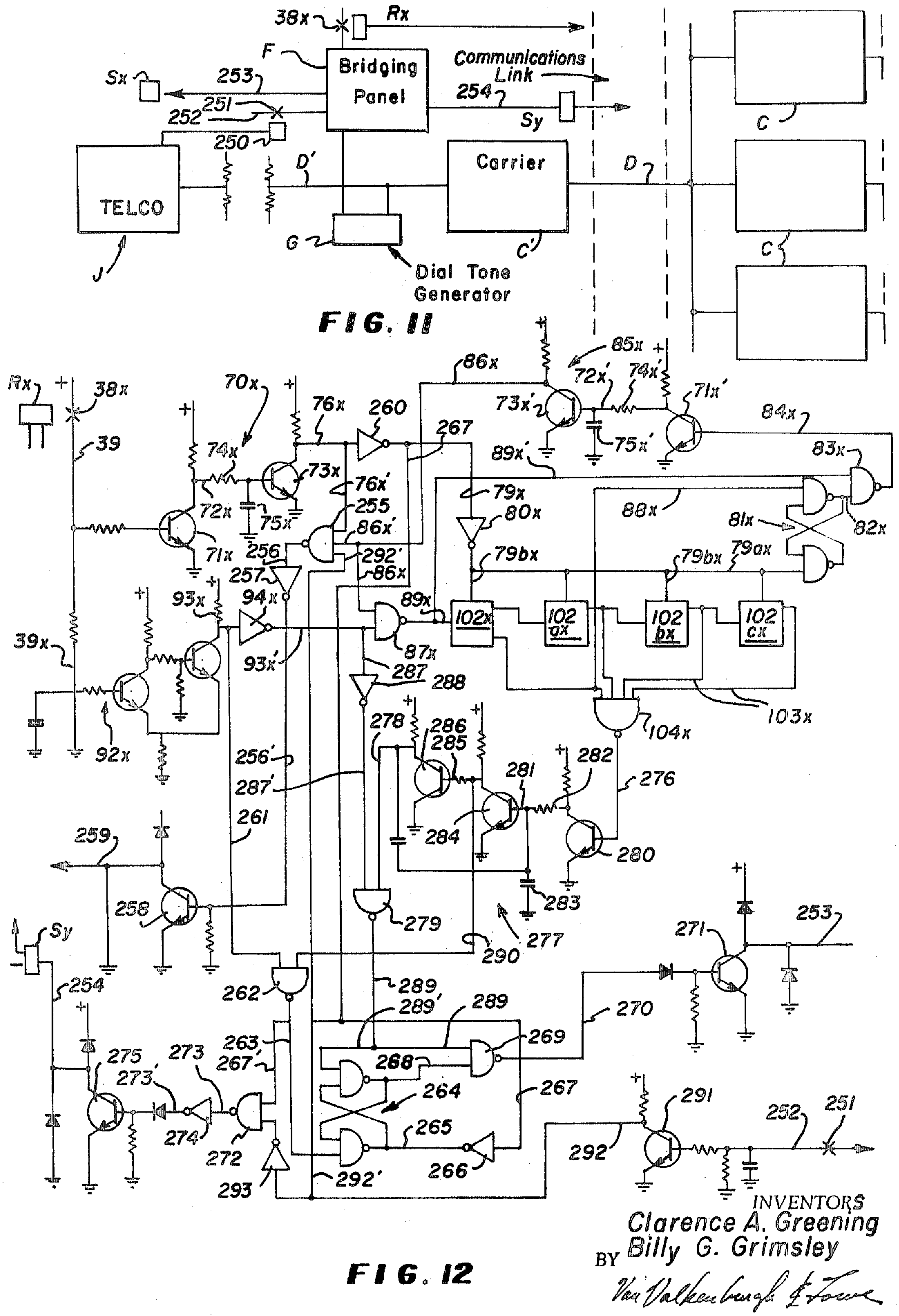
FIG. 11 is a block diagram of portions of the showing at FIG. 3 to better illustrate the manner in which an improved bridging panel is associated with the carriers and also with Telco or other central control equipment when a party line system is being used.
FIG. 12 is a circuit diagram of the bridging panel indicated in FIG. 11.

FIG. 5 shows a block diagram including component subassemblies within the first digit pulse selector 50 and the component subassemblies in one of the second digit pulse selectors 51 and the relay panel associated with it. The pulsing switch 38 in the lead 39 connects with reset-timer and lockout controls 56 and with a pulse control 57. Both of these controls connect with a first digit pulse decoder 58. Both also connect with a phone seizure interlock 59 operable either when a local phone, at one of the extensions, is lifted to seize the circuit or whenever a remote phone, from an incoming call, connects into the system. Both the reset-timer control 56 and the pulse control 57 are interconnected in the interlock 59. The interlock 59 may connect with an auxiliary timer 60 if there is no connection with a bridging panel board F such as illustrated at FIGS. 3, 11 and 12. A jumper 61 is provided in the connection between the interlock 59 and timer 60 to disconnect the timer if it is not needed. The lead 44 to send the relay S, the lead 41 having normally closed switch 40 and the lead 43 having normally closed switch 42 extend to the interlock 59. Also, a lead 62 is in interlock 59 to actuate an alarm 63 to signal an operator whenever a local telephone is lifted off a hook for an excessive time period. This alarm may be conveniently located at a carrier or PBX-board, where an operator is on duty.

The component subassemblies within the second digit pulse selector 51 include a timer 64 and a second digit pulse decoder 65 which are connected with one of the eight output leads of the first digit pulse decoder 58 and with a lead from the pulse control 57. It also includes a ring signal generator 66, and both the ring signal generator and second digit pulse decoder 65 connect with the relay panel 52 which, in turn, connects with the various telephone extensions and the carrier drop C, as heretofore described.

The subassemblies set forth above are all formed as solid-state units and integrated circuits of solid-state units, which are generally conventional in their parts and represented by conventional symbols. The entire apparatus functions with circuits wired for computer logic, where the voltage is at a logical "0" level or at a logical "1" level, or potential, such levels being effective to lock out or release flow through the various diodes, transistors and other components, to produce the needed functional relations as now set forth.

THE RESET-TIMER AND LOCKOUT 56

Figure 6:
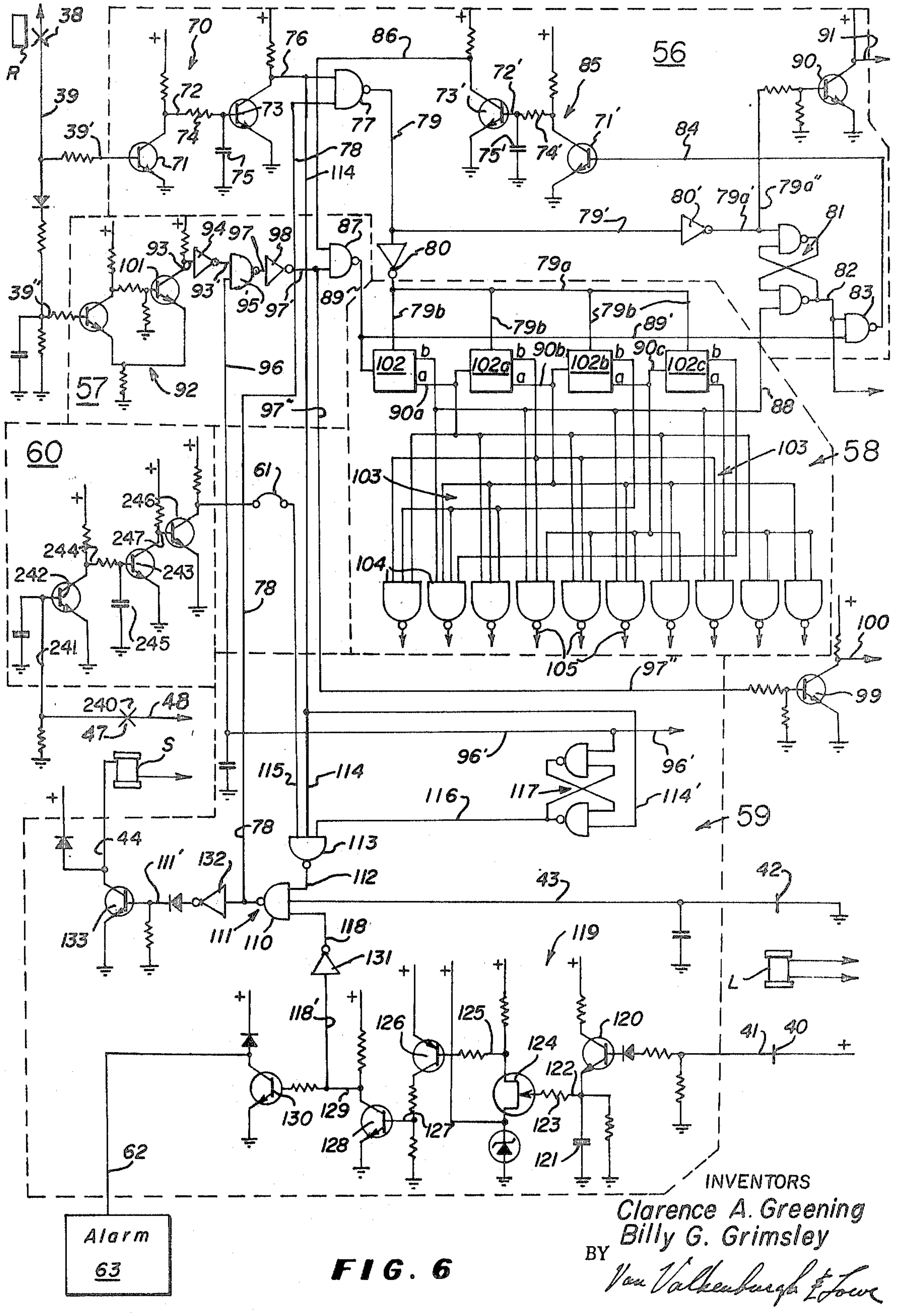
FIG. 6 is a circuit diagram of portions of the selective ringing unit located in certain blocks of the diagram of FIG. 5.

Referring now to FIG. 6, the first input to the selector unit U commences when a remote telephone is connected into the circuit or a connection is otherwise made as at the PBX-board to effectively seize carrier drop D' and energize the relay R. Prior thereto, the potential in the lead 39 in its idle state, is at a "0" level. A shift to a "1" level occurs when the circuit is seized and the relay R closes switch 38.

A lead 39' connects with a timer 70 which functions to pass only the line seizure to the first digit pulse decoder 58 and thence to the second digit pulse decoder 65. The individual pulses of each pulse train occur too quickly to affect this timer. The lead 39' connects to the base of a transistor 71. The collector of this transistor is connected by lead 72 to the base of transistor 73. A resistor 74 is in this lead 72. A condenser 75 between the lead 72 and ground functions with the collector lead resistor of transistor 71 to provide the time lapse effect. The condenser is normally charged when the lead 39' is at the "0" or idle state. A change of state, to a "1" at the base of the transistor 71, grounds and reduces the voltage on lead 72 to zero and causes capacitor 75 to discharge. The time interval to effect this discharge is short, but a timed interval is required to recharge the condenser to turn off transistor 73 sufficiently long so that the dial pulses cannot effect a seizure release. A suitable time interval for this purpose is approximately 120 milliseconds because the normal time between dial pulses is 50 milliseconds.

The action of the timer is to place a "1" level on lead 76 extending from the collector of transistor 73. This lead connects with a 2-input DTL-gate 77. This gate and other gates disclosed herein, are diode-transistor logic circuits of the type having one or more inputs. When the inputs are at a "1" level, the output is at "0" level when the gate is open. Such gates are described in the publication *Electrical Digital Components and Circuits* by R. K. Richards, (1967) published by Van Nostrand and Company, Inc. It is to be noted that there must be various potentials applied to each of these gates and transistors, hereinafter described. Such sources of potential and the connections thereto with the gates and transistors are conventional and hence, are not described herein.

The output lead 79 of gate 77 extends to an inverter 80, a single input DTL-gate, and the continuation 79*a* of the lead 79 connects with the first digit pulse decoder to unlatch binary counters, as hereinafter described. A branch 79' from lead 79, extends to an inverter 80' and continuation lead 79*a'* connects into one input of a 2-input latch 81. The lead 79 is at a "1" level in the idle state and the extensions 79*a* and 79*a''* are inverted to be at a "0" level in the idle state. Thus, a "1" level is placed upon the input lead of latch 81 whenever switch 38 closes.

The latch 81 is a conventional integrated circuit made up of a pair of gates having crossed leads. The output lead 82 of the latch connects with one input of a 2-input gate 83. The output lead 84 of gate 83, in turn, connects with a timer 84 and the lead 86 from this timer connects with one input of a 2-input gate 87 in the pulse control 57, as hereinafter described. The circuit, extending from latch 81 and terminating at gate 87, is effective to lock out the second digit pulse train from the first digit pulse decoder 58 through action of latch 81 and timer 85.

The latch 81 also has an input lead 88 extending from the decoder 58 which is at an initial "1" level when the output of the latch is at a "0" level. Thus, the latch changes, as soon as the first digit pulse train commences, to change its output to a "1" level and unlock gate 83. Gate 83 also has a lead 89' connecting with the output lead 89 of gate 87 which permits the first digit pulse train to pass through gate 83 to the timer 85. This timer 85, similar to timer 70, includes a transistor 71' whose base has a logical 1 in the idle state, a lead 72' to a second transistor 73 which is not conducting when in the idle state, a resistor 74' in the lead 72' and a capacitor 75' between lead 72' and ground. The capacitor 75' is normally discharged, but requires 120 milliseconds to charge and to render transistor 73' conducting. Thus, the first digit pulse train will not pass this timer until the last pulse. Then the state of lead 86 drops to zero to lock the gate 87 against the second digit pulse train, this condition remaining until the latch 81 is reset.

To complete the components within the reset-timer and lockout 56, a lead 79*a''* extends from the lead 79*a'* to the base of a transistor 90 which functions as a driver, a lead 91 extending from the collector of this transistor and to components within the second digit pulse decoder 65 as hereinafter described. It is to be noted that the lead 79*a''* will have an initial "0" level and whenever the potential on the lead is changed, as by unlatching gate 77, the driver 90 becomes operative.

PULSE CONTROL 57

The potential in lead 39 is shifted from an initial "0" level to a "1" level when the circuit is seized. Thereafter, momentary pulses will occur responsive to dialing signals. Referring again to FIG. 6, these pulses extend through a lead 39'' to a Schmitt trigger 92, thence through a lead 93, through an invertor 94 with the lead 93' therefrom connecting with one input of a 2-input gate 95. The other lead 96 of gate 95 extends from the interlock 59 as hereinafter described, and normally has a potential at a "1" level so that pulses in lead 93' will pass through this gate 95. The output lead 97 of the gate 95 extends through an invertor 98 and its continuation lead 97' extends to the gate 87 heretofore described, to pass pulses through lead 89 and to the first digit decoder 58. A lead 97'' branching from lead 97' extends to the base of a transistor 99, which forms a driver, with a lead 100 extending from the collector of this transistor and to the second digit pulse decoder 65 to pulse the components in that unit as hereinafter described.

The Schmitt trigger, formed by interconnecting two transistors 101 in a cascaded arrangement, is used to shape pulses to provide for a sharp rise and fall of the potential so that the pulses are suitable for driving binary counters. This circuit is commonly used for that purpose and is described in the aforementioned publication by Richards.

The pulse control thus functions as follows: Whenever the input at the gate 87 is at a "1" level, imposed upon lead 39 by a remote seizure of the circuits, the subsequent pulses shaped by the Schmitt trigger feed the first pulse train to the decoder 58 through gate 87. When the first digit pulse train terminates and lead 86 is changed from a "1" to "0" level, as heretofore described, gate 87 locks out the first digit pulse decoder 58 and diverts the remainder of the pulses to the second digit pulse decoder 65, through lead 97'' and thence through the output lead 100 of the driver formed by transistor 99.

DECODER 58

The first digit pulse decoder 58, as in FIG. 6, includes an array of flip-flops 102, **102*a*, 102*b* and 102*c*** interconnected in tandem. Such flip-flops are conventionally used as counters in binary-decimal counting conversion. Various types of flip-flops are described in the aforementioned publication by Richards. One type of flip-flop suitable for use is conventionally recognized as a clocked type connected for J–K operation. It has a reset input, a receiving input and two outputs, one at a "0" and the other at a "1" level. The output levels alternate to effect the flip-flop action, but reset to a given state responsive to a pulse at the reset input. When so reset, the output *a* of each flip-flop will be at a "0" level and the output *b* of each flip-flop will be at a "1" level. The alternation is effected responsive to pulses at the receiving input.

Each flip-flop is connected at its reset input to a lead **79*b* from the lead 79*a* heretofore described. Thus, whenever the potential of lead 79*a* is changed to a "1" level, by closure of relay switch 38, all of the flip-flops are reset and are ready for a counting operation. The lead 89 from gate 87 is connected into the receiving input of the first-in-line flip-flop 102. A lead 90*a*** from its output *a* is connected to the receiving input of the flip-flop **102*a*, and likewise, leads 90*b* and 90*c* interconnect the flip-flops 102*b* and 102*c*** at their respective outputs *a* in tandem.

The operation of the flip-flops as counters is initiated by a dial pulse train through the lead 89. All of the pulses will be received by flip-flop 102, but only every other pulse will be transmitted from flip-flop 102 to flip-flop **102*a*, through lead 90*a*. Likewise, the pulses transmitted from flip-flop 102*a* to flip-flop 102*b* will be only half of those received and the pulses transmitted from flip-flop 102*b* to flip-flop 102*c*** will be only half of those received. This action, in effect, provides a binary counter wherein one output of a flip-flop will be at a "1" level and the other output will be at a "0" level in varying sequences.

A network of circuits 103 which include lead 88 interconnect with both outputs *a* and *b* of each flip-flop to extend to a group of 10, 2, 3, and 4-input extension gates 104 in an arrangement wherein the varying states of the outputs of the flip-flops are directed to the input of the gates 104 to place a "1" level on each input of a gate to open the same. For example, if 4 pulses occur in a dialing, the flip-flop 102 would have a "1" level at its *b* output, the flip-flop **102*a*** would have a "1" level at its *b* output, the flip-flop **102*b*** would have a "1" level at its *a* output and the flip-flop **102*c*** would be disconnected.

When the first digit pulse train is completed, gate 87 is locked as heretofore described, and the particular extension gate 104 which is unlocked at the termination of the digit pulse train, remains in the unlocked state. This output lead 105 extends to the timer 64 associated with the second digit pulse decoder to actuate that timer as hereinafter described.

PHONE SEIZURE INTERLOCK 59

The phone seizure interlock consists of various circuits directed into a 3-input interlock gate 110, the output lead 111 thereof having a normal "1" level. This output lead 111 connects with lead 78 to place a normal "1" level upon the gate 77 to permit a remote seizure to unlock the gate 77 through lead 76 as heretofore described. Two of the inputs to this gate 110, hereinafter described, are ordinarily at a "1" level. The third input is ordinarily at a "0" level and is from lead 43. The normally closed switch 42 in the lead 43 is opened by relay L whenever a local telephone seizes the circuit. This circuit 43 is normally grounded, but when the switch 42 opens, the potential is at a "1" level at the gate 110. This changes the level of the output 111 to "0", changes the level of lead 78 to "0" and thereby locks gate 77 to prevent remote seizure of the circuit.

A second lead 112 to the gate 110 is operated through a 3-input gate 113. This gate is used to control the normal operation of the gate 110. One lead 114 is directly connected with the lead 76 and is thus at a "0" level when the circuit is idle, but rises to a "1" level by a remote seizure which changes the lead 76 from a "0" level to a "1" level. If the two other leads are at a "1" level, a "0" level is on lead 112 locking gate 110. A second lead 115 to this gate 113 connects through jumper 61 with the auxiliary timer 60 hereinafter described, and is at a "1" level in normal operation.

A third lead 116 to gate 113 connects with the output of a latch 117. A branch 114' of lead 114 connects with one input of the latch 117. A branch 96' of the lead 96 which extends to one input of the gate 95, also extends to one input of the latch 117. This lead 96', in turn, extends from the second digital pulse selector to be actuated at the end of the second digit pulse to change its state from a "1" to a "0" and to change the state of the output of lead 116. This locks gates 95 and at the same time trips the latch 117 so that its output will be at a "0" level. This assures a "1" level being maintained through lead 112 and at gate 110 so that a local telephone may pick up the extension at any time after the second digital pulse train selects and commences ringing the extension.

The third lead 118 to gate 110 extends from a timer 119 and is normally at a "1" level at gate 110, but may change its potential to a "0" level should a local telephone be left off its hook for an excessive period of time. This provides a means to release the circuit to permit an incoming call or calls between other stations and to warn an operator is such does occur. The timer 119 is formed as an array of transistors, resistors and capacitors including a Field Effect Transistor to extend the time delay to a suitable period such as 40 minutes, and whenever the timer operates beyond such time period, it will reverse the potential in lead 118 and at the same time actuate a driver to set off the alarm 63.

This timer commences with lead 41 and extends to the base of transistor 120 which is normally conducting when the switch 40 is closed. The emitter of transistor 120 connects with one side of a grounded capacitor 121 which is in a charged state and a lead 122 from this emitter having resistor 123 connects with the gate of the Field Effect Transistor 124. The charge on lead 122 renders the transistor 124 conductive and a lead 125 from the collector of this transistor is connected with the base of a transistor 126. A lead 127 extends from the collector of that transistor to the base of a transistor 128 and a lead 129 from the transistor 128 connects with the base of a transistor 130 which functions as the driver for the alarm 63. The operation of this sequence of transistors is initiated whenever the switch 40 opens rendering the transistor 120 nonconductive. This causes the capacitor 121 to slowly discharge through the field effect transistor 124. A resulting potential upon transistor 126, which is a PNP-type, is thus turned off by the resulting potential on lead 125. This cuts off the potential at the base of transistor 128 and causes an increase in potential at its collector to provide a current flow through the driver transistor 130 which is sufficient to actuate the alarm 63.

In addition to placing a charge at the base of transistor 130 to effect an alarm, a lead 118' connected with lead 129 is also changed from a "0" to a "1" state. This lead extends through an invertor 131 to lead 118 heretofore mentioned. Thus, whenever the change of state on lead 118 from a normal "1" to a "0" level occurs, the interlock gate 110 is locked and the seizure against an incoming call is removed. That is, the potential at lead 111 via lead 78 to gate 77 is returned to a "1" level so that an incoming call is possible at the other stations of a party line. Also, whenever the lead 111 is at a "0" level to lock out an incoming call, the S relay is energized because the lead 111 extends through an inverter 132 to the base of a driver transistor 133 whose collector extends to relay S. Accordingly, when the potential of lead 111 is changed from a "0" to a "1" level, the relay S is deenergized to drop off the local seizure and allow other stations to use the circuit.

TIMER 64 FOR SECOND DIGIT PULSE DECODER

Figure 7:
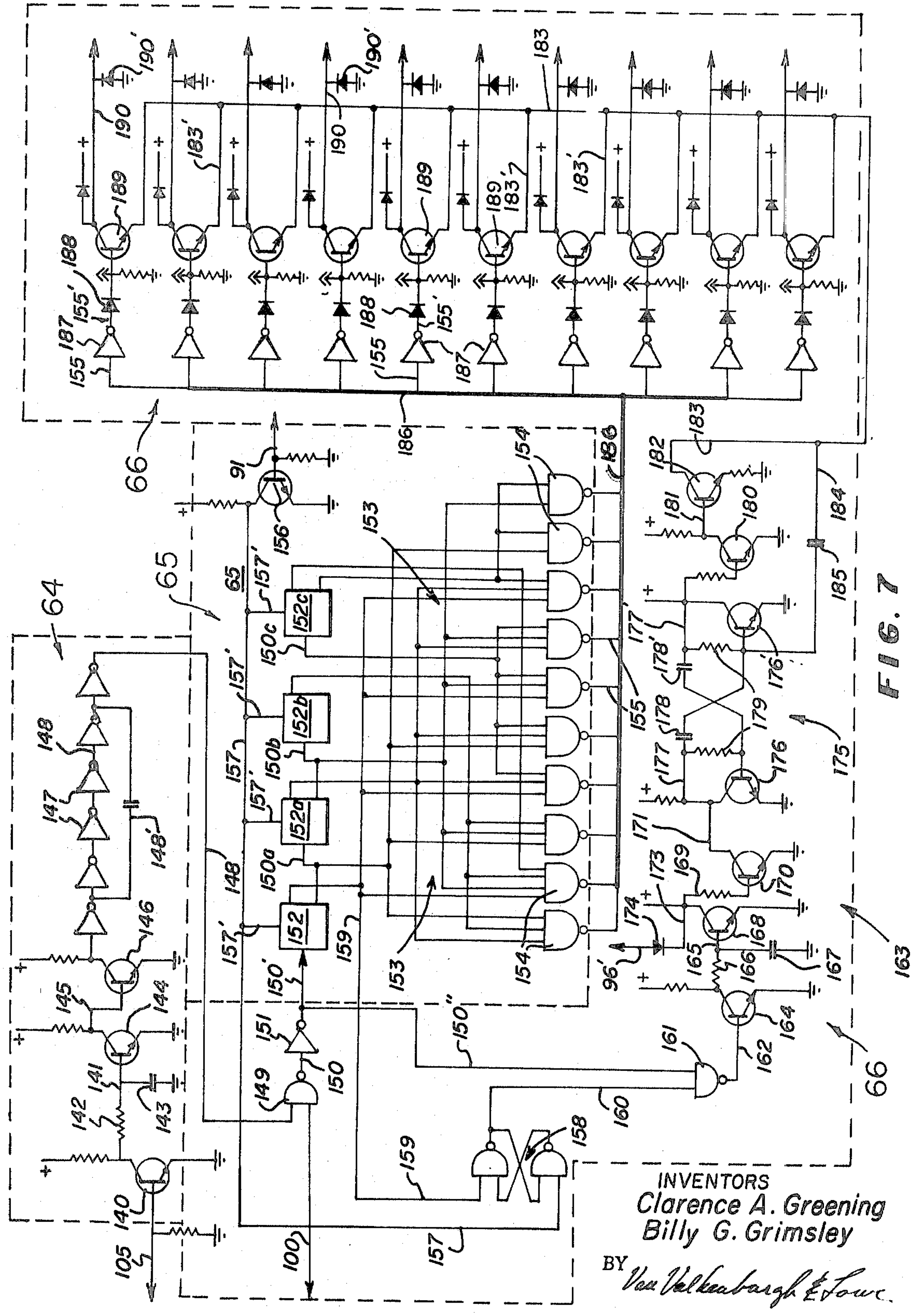
FIG. 7 is a circuit diagram of other portions of the selective ringing circuit located in other blocks of the diagram of FIG. 5.

The first dial pulse train through first digit pulse decoder 58 activates and locks in only one gate 104 and the lead 105 of that gate is connected with one of the second digit pulse selectors 51 of the group shown at FIGS. 2 or 3, so that the second dial pulse train may select an extension telephone from the group connected with the specific selector 51. Since all of the selectors 51 are similar, only the components of one pulse selector 51 will be described. The lead 105 extends to a timer 64, commencing with the base of a transistor 140, as shown at FIG. 7. A lead 141 from the collector of this transistor includes a resistor 142 and a condenser 143 between the lead and ground. This lead 141 extends to the base of a transistor 144. A lead 145 from the collector of transistor 144 extends to the base of a transistor 146. A sequence of inverters 147 are in a lead 148 and this lead extends from the collector of the transistor 146 to one input of a 2-input gate 149. The six inverter gates 147 function, in combination with a feedback capacitor lead 148 to decrease the transition time of unlocking the gate 149, by virtue of the amplifying action of the series gate 147. When the input lead 105 changes from a "1" to a "0" level, the transistor 140 turns off allowing capacitor 143 to commence charging. This capacitor is timed for a period, such as 120 milliseconds to reach a charge sufficient to turn on transistor 144 and through inversions, the lead 148 at gate 149 is at a ""1" level. Accordingly, this timer 64 is used to prevent pulses of the first dial pulse train from acting upon the second digit pulse decoder until the first dial pulse train has completed its pulsing and until the specific gate 104 of the first digit pulse decoder 58 is actuated and locked in by the last pulse of the first dial pulse train.

SECOND DIGIT PULSE DECODER 65

The second digit pulse decoder 65 also connects with the first digit pulse decoder through the lead 100 which extends to gate 149 as the other input. This lead 100 is directly connected to the Schmitt trigger 92 through lead 97" and through the gates 95 and 98. Accordingly, the leads 100 and 148 open gate 149 when they are at a "1" level. The output lead 150 of gate 149 extends through an inverter 151 and extends thence to a sequence of four flip-flops 152, 152*a*, 152*b* and 152*c* connected in tandem by leads 150*a*. 150*b* and 150*c*. Accordingly, the pulses from the second dial digit, directed through lead 100, actuate the flip-flops to cause them to function as binary counters, the same as heretofore explained in connection with the flip-flops 102, 102*a*, 102*b* and 102*c*. An array of circuits 153 extend from both outputs of each flip-flop to connect with an array of 2-input, 3-input and 4-input distributor gates 154 in the same arrangement as with gates 104. The outputs 155 of these gates 154 extend to ringing actuator relays, as hereinafter described.

The operation of the flip-flops 152, 152*a*, 152*b* and 152*c* requires a reset potential, the same as heretofore described. Extension lead 91, connecting with the output of timer 70, as heretofore described, extends to the base of a driver transistor 156 at the second digit pulse decoder. A lead 157 extends from the collector of this transistor and branches 157' connect with the reset inputs of the flip-flops. Whenever the potential of lead 91 drops from "1" to "0" level by a remote seizure operating through timer 70, the lead 157 is at a "1" level to effect the reset of the flip-flops so they are ready for binary counting.

This lead 157 extends to one input of a latch 158. Another lead 159 connecting with the output of the flip-flop 152, which is shifted to a "1" level responsive to the first pulse of the pulse train, extends to the other input of the latch 158. The output lead 160 from latch 158 extends to one input of a 2-input gate 161. Whenever operation commences with a "1" potential at the lead 157 and whenever the potential on the latch 158 is changed by the first digit pulse through flip-flop 152, the potential of the latch output is changed from a "0" to a "1" to unlock gate 161. This gate has an output lead 162 extending to a timer 163 which is part of the ring signal generator 66. Another lead 150" extends from the lead 150 to the other input of the gate 161. This gate thus locks in the timer 163 as the second digit pulse train terminates, as will be described.

RING SIGNAL GENERATOR 66

The ring signal generator 66 includes the timer 163 which receives the second dial pulse train from lead 162 but will not react to pass a pulse for a 120 millisecond period or the like to prevent signal ringing from occurring until after the second dial pulse train is completed. Also, this timer is connected by a lead 96' to the phone seizure interlock and thence to the gate 95, heretofore described, which eliminates the remote seizure and permits an answering party to seize the line when he picks up the phone after it commences ringing. The timer 163 includes a transistor 164 having the lead 162 connected to its base. A lead 165 from the collector of this transistor includes a resistor 166 and a capacitor 167 between it and ground and connects thence to the base of a transistor 168. A lead 169 extends from the collector of transistor 168 to the base of transistor 170. A lead 171 extends to a multivibrator, as will be described. A lead 173 extends from the collector of transistor 168 to an isolating diode 174 which, in turn, connects with the lead 96' extending to the gate 95, as heretofore described.

The multivibrator 175, a conventional a stable type, provides off and on pulses to time the ringing signal. This unit consists of a transistor 176 whose collector connects with lead 171 and a lead 177 from the collector connects with the base of an opposing transistor 176'. A lead 177' from the opposing transistor connects with the base of transistor 176. Capacitors 178 and 178' in these respective leads and resistors 179 between the respective leads time the period of reversing, their values being selected to provide an interval, such as a 3 seconds off, 3 seconds on action.

The output of this multivibrator, at the collector of transistor 176' is directed to the base of a transistor 180, and lead 181 from the collector of transistor 180, is connected with the base of a driving transistor 182, whose collector extends as a lead 183 to drive ringing actuator relays of any one of the 10 extension drivers as hereinafter described. To complete this multivibrator, a lead 184 with condenser 185 shunts lead 183 and the base of transistor 176 to provide a regenerative feedback action.

The 10 gate leads 155 are shown as being collected in a loom 186 for extension to drivers for each extension of the second digit pulse selector. Each lead 155 connects with the inverter 187, and the extension 155' is connected through an isolating diode 188 to the base of a driver transistor 189. A lead 190 extends from the collector of the transistor to a relay K, heretofore described. The emitter of each transistor 189 is connected to an extension 183' of the lead 183 which extends to the collector of transistor 182 and thence through its emitter to ground to complete the circuit. To prevent a negative RF-spike on the transistors, which may occur on the collector of transistor 189 as the relays operate, a grounded diode 190' is connected to this lead 190.

Accordingly, whenever the second dial pulse train selects a gate 154, the output lead of that gate will activate the transistor 189 associated with it, and a suitable potential will drive this transistor responsive to the pulsing action of the ring signal generator.

RELAY PANEL 52

Figure 8:
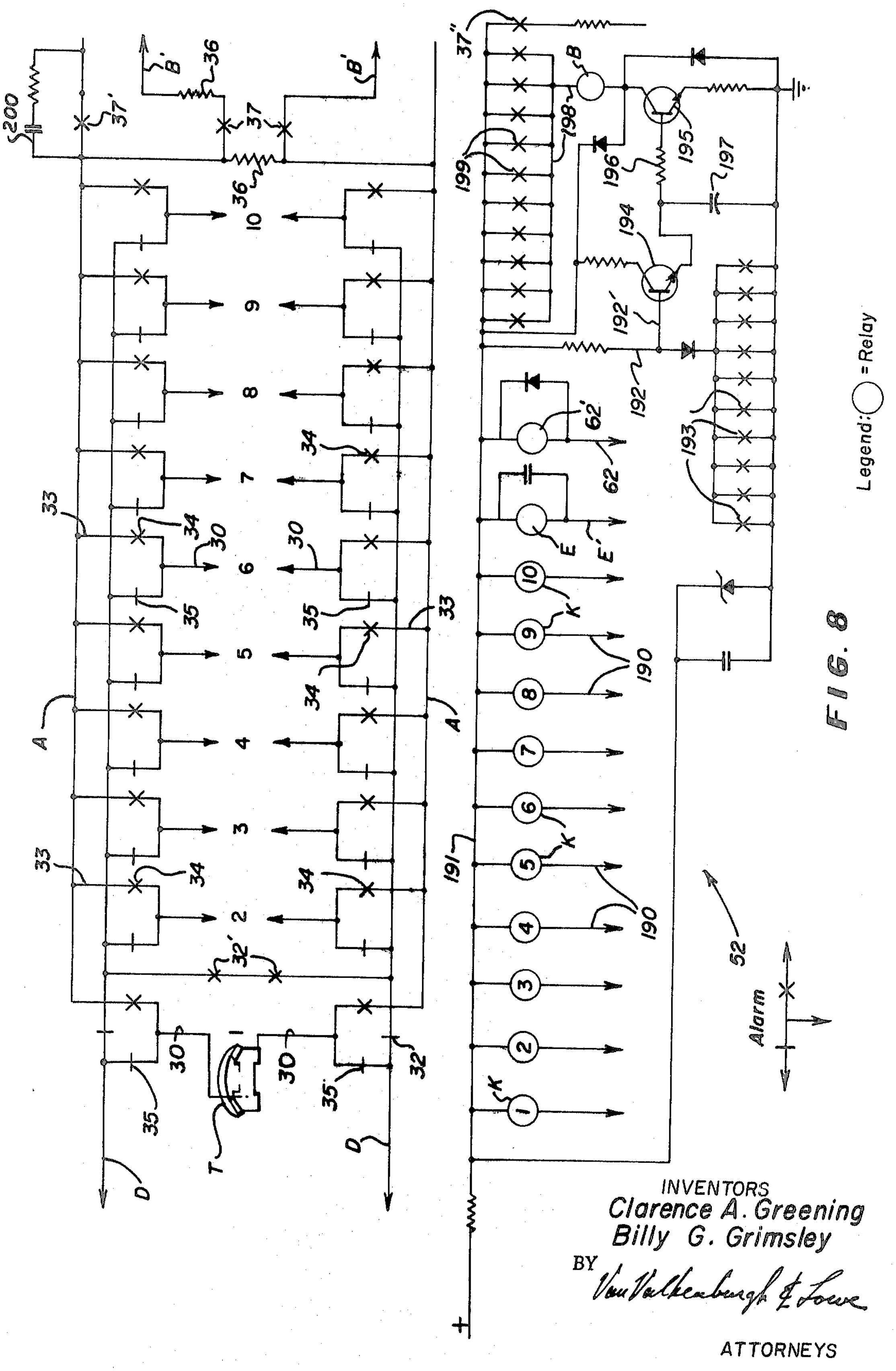
FIG. 8 is a circuit diagram of an arrangement of relays to effect ringing of telephone extensions selected by the apparatus.

A relay panel 52, as shown at FIG. 8, is associated with each second digit pulse decoder 65 to ring an individual telephone extension on the common carrier drop. Each lead 190 from the ring signal generator of the second digit pulse decoder 51 extends to an individual relay K, the relays being numbered 1 through 10 and will thus be referred to as relays K1 through K10. A lead 191 from a power source connects with the respective leads 190. Accordingly, whenever the selection of an extension is completed by the 2-digit dialing operation, the ringing operation commences, with only one relay being actuated on and off at 3-second intervals, as heretofore explained.

Each K relay is adapted to actuate various sets of switches. FIG. 8 illustrates a portion of the carrier drop leads D having 10 sets of extension leads 30 indicated 1 to 10 to correspond with the 10 K relays. Each extension lead 30 includes the normally closed switch 35, which is adapted to open whenever a ringing potential is applied to its relay K. A ring voltage line A parallels each carrier drop lead D and an extension lead 33, having normally open switch 34, connects the ring voltage line with each extension lead 30. The switch 34 closes to apply a ringing voltage to the lead 30 whenever the switch 35 opens, as heretofore described.

In addition, switches 37 operate the ringback circuit B', a switch 37' controls the ringing voltage on the line A and switch 37'' controls circuits in the carrier panel which need not be described herein. Each of these switches 37, 37' and 37'' are operated by a relay B which, in turn, is energized by any one of the relays K. However, a timer is provided to deenergize relay B before relays K are deenergized at the end of a 3-second ring cycle to open contact 37' prior to the opening of contact 34 to prevent arcing at those switches.

This timer includes a lead 192 having 10 branches to ground with a normally open switch 193 in each branch. Each switch 193 is operated by one of the 10 relay switches K, the switch closing to render the lead 192 conductive. A branch 192' of this lead connects with the base of a transistor 194, and accordingly, whenever the switches 193 are open, the transistor is conducting, but nonconducting when any one of the switches 193 is closed. The emitter of transistor 194 extends to the base of a transistor 195 and includes a resistor 196 and a capacitor 197 between it and ground. The collector of transistor 195 carries the relay B and this collector lead 198 branches into 10 leads connecting with power source lead 191. A normally open switch 199 is provided in each lead and each switch 199 is closed by its respective relay K.

In operation of this timer, whenever the switches 193 and 199 are open, the capacitor 197 is charged, but transistor 195 is not conducting. When any K relay is energized, the switches 193 and 199 close, transistor 194 is rendered nonconducting, but transistor 195 conducts, energizing relay B. The capacitor 197 starts to discharge and at the selected time interval, short of the ringing cycle imposed by the ring signal generator 66 and upon discharge, the transistor 195 is cut off to deenergize relay B, even with the switch 199 being closed. By timing the capacitor to complete its discharge a short interval before the ringing signal generator cuts off, the switches 34 are not subject to arcing when they open. Switch 37' thus controls the ringing voltage current and an RC-circuit 200 shunts switch 37' to assist in suppressing an arc across switch 37' when it opens.

To complete the relay panel, the exclusion relay E is conveniently located with the lead E' being connected with supply lead 191 and an alarm relay 62' in lead 62 may also be conveniently, but not necessarily, located in the relay panel and connected with supply lead 191 as illustrated. The alarm 63 is actuated whenever the relay 200 is energized as by the driver transistor 130 whereto the lead 62 is connected. This alarm is not described in detail since it may be a light, a buzzer or any other suitable device for warning an operator of the equipment that a telephone extension has been left off its hook for an extensive time period.

EXTENSION AND REMOTE RELAY PANELS 53 AND 55

Figure 10:
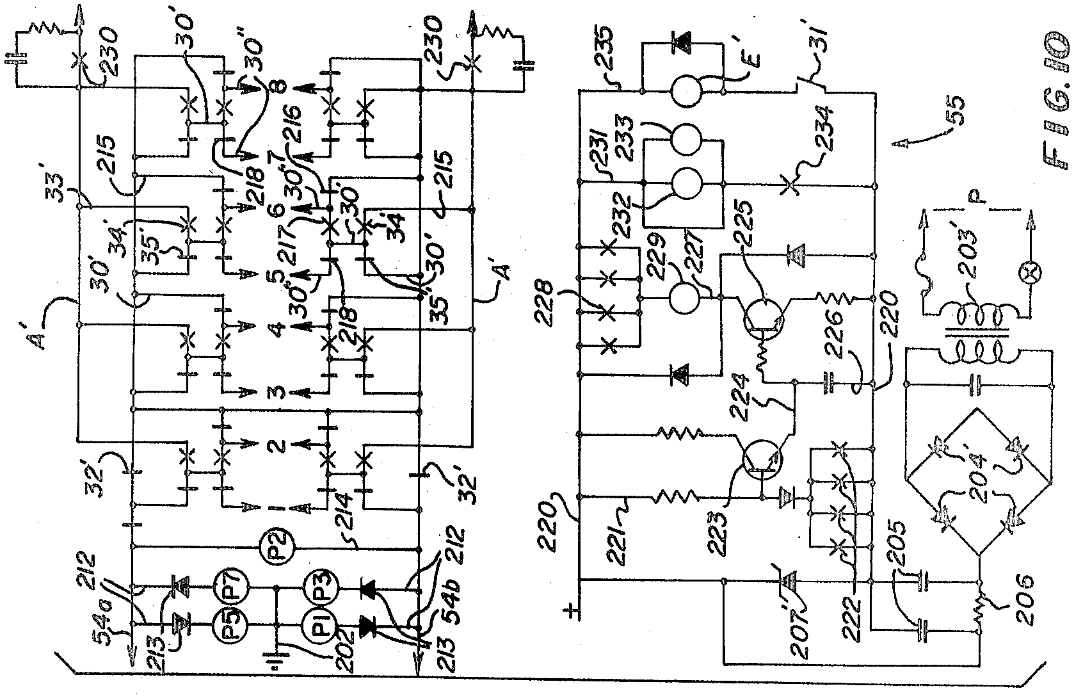
FIG. 10 is a circuit diagram of an arrangement of a relay group to effect ringing of remotely located telephone extensions connecting with the wire line extensions of FIG. 9.
Figure 9:
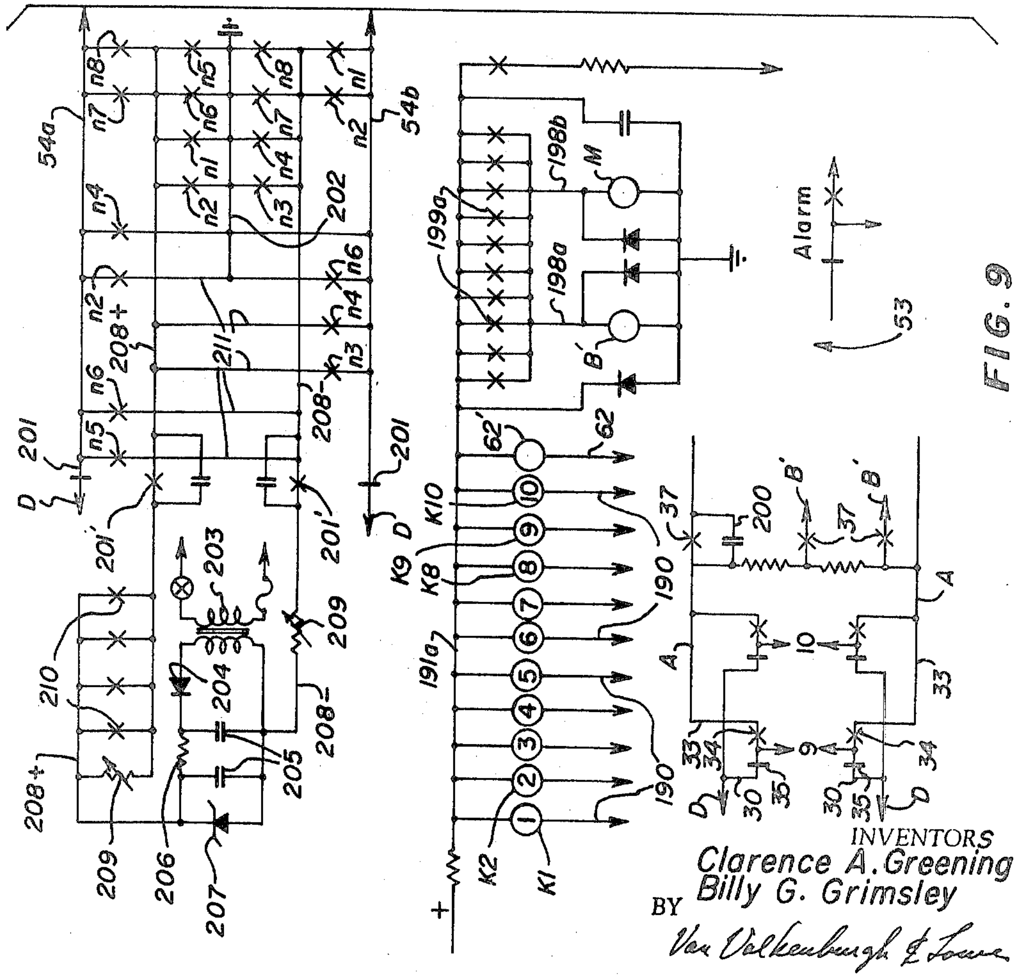
FIG. 9 is a circuit diagram of an arrangement of relays in an extension relay group as indicated at FIG. 4, wherein the relays are associated with a pair of wire lines which extend to telephones remotely located, that is beyond the normal reach of the apparatus depicted at FIGS. 2 and 3.

As set forth in the diagrammatic illustration at FIG. 4, a group of eight extensions may be connected to a wire line pair 54 at a location which is too distant for direct connection to a relay panel 52 and these extensions may be rung individually by using a modified extension relay panel 53 connected with the second digit pulse selectors and a remote panel 55 connected with the wire line pair 54 extending from panel 53. The circuits of the extension relay panel 53 are shown at FIG. 9 and the circuits of the remote relay panel 55 are shown at FIG. 10, with these circuits being interconnected by the wire lines **54*a* and 54*b* as indicated in the drawing. It is to be noted that these lines 54*a* and 54*b* are a portion of the carrier drop D, as indicated at FIG. 9. However, in using these wires to ring an extension, they are disconnected from the carrier drop D by normally closed switches 201. Also, to effect an eight-station selective ringing operation, a ground line 202 between wire lines 54*a* and 54*b*** is used.

The three lines **54*a*, 54*b* and ground 202 are selectively charged with positive or negative voltage at the relay panel 53 in various arrangements, and the lines energize certain selected relays P at panel 55 which are in circuit leads having restrictive diodes as will be described. The voltage source at panel 53 is supplied from a conventional AC power source, by using a voltage reducing transformer 203, a rectifying diode 204, capacitors 205 and a resistor 206 to minimize fluctuations and a zener diode 207 to function as a voltage regulator. The DC voltage is applied to lines 208+ and 208– and these each include a variable resistor 209 to adjust the load depending upon the distance from panel 53 to the panel 56. However, the line 208+ includes four normally open relay switches 210 in leads shunting the resistor 209, any one of which may close to increase the voltage on the lines when necessary as will be explained. The lines 208+ and 208– also include normally open switches 201' and continue thence to parallel the wire lines 54*a*, 54*b* and ground 202 to connect with these wire lines and with ground by leads 211, with each lead 211** having normally open relay switch N.

The 10 output leads 190 of the second digit pulse decoder 65 have relays K, indicated as K1 to K10 as heretofore described, and these leads 190 connect with a power source lead **191*a*. Eight of these K relays, K1 to K8, are used with this panel 63 and function to close certain switches N in the leads 211. The even numbered relays K2, K4, K6 and K8 function to close the switches 210 in line 208+. The other two K relays, K9 and K10, may be used to ring stations local with respect to the selection apparatus. The 10 K relays operate 10 respective normally open switches 199*a* in a parallel bank of branches of a lead 198*a* wherein a relay B is located. A lead 198*b* connects with and extends in parallel to lead 198, and a relay M is located in that lead to operate in unison with relay B whenever a switch 199*a* is closed. Both leads 198*a* and 198*b* connect with power lead 191*a* and extend to ground. Relay B operates a ringing circuit for the extensions K9 and K10 and relay M operates to open the switches 201 to take leads 54*a* and 54*b* off the carrier drop D and to close the switches 201' to apply voltage to lines 54*a*, 54*b* through power lines 208+ and 208–**.

Each connecting lead 211, having the N switches of the relays K1 to K8, will be closed by energizing an appropriate K relay to provide for varying polarity combinations of potential upon the lines **54*a*, 54*b* and ground lead 202. For example, two switches N1 are operated by relay K1** placing a positive potential upon the ground line and a negative potential upon line 54b; three switches N2, operated by relay K2, place a positive potential upon the line 54a and upon the ground and a negative potential upon the line 54b and at the same time, switch 210, operated by relay K2, shunts resistor 209 to increase the voltage load since all three lines are charged; two switches N3, operated by relay K3, place a negative potential upon the ground and a positive potential upon line 54b. Likewise, the switches indicated as N4, N5, N6, N7 and N8 may be traced to show eight combinations of different potentials upon two or three of the lines 54a, 54b and 202. These varying potentials are picked up by selective relays at the remote panel 55, FIG. 10, to ring the selected extensions as will not be described.

The remote relay panel 55 includes the wire lines 54a and 54b which extend from panel 53. It also includes a ground wire 202'. Two leads 212 extend between the ground wire and each wire line 54a and 54b. Each lead includes a relay coil, indicated as P1, P3, P5 and P7 and each lead 212 also includes a diode 213, the diode of each lead being directed opposite to the diode in the adjacent lead. Therefore, with a selected potential between the line 54a and ground, or between the line 54b and ground, current flows through only one lead 212. For example, whenever the switches N1 place a positive charge upon ground and a negative charge upon line 54b, relay P1 will be energized. This occurs whenever relay K1 is energized. Likewise, relay K3 will be energized to energize relay P3, K5 to energize relay P5 and K7 to energize relay P7.

Another relay P2 is connected to a lead 214 between the wire lines 54a and 54b and this relay is energized whenever a potential is imposed between the lines 54a and 54b. It is to be noted that this relay P2 will operate with operation of one of the relays P1, or P3, or P5 or P7, and that such operation is arranged to occur whenever the even numbered K relays are energized, that is, relays K2, K4, K6 and K8. Thus, the N switches and P relays form a decoding system for selective ringing of the panel system.

Eight telephone extensions are provided between the lines 54a and 54b at panel 55 and are indicated by numbers 1 to 8. These eight extensions are arranged in four groups of pairs, extensions 1 and 2 in the first group, extensions 3 and 4 in the second, 5 and 6 in the third and 7 and 8 in the fourth group. The four groups of telephone extension leads 30' are directed from each line 54a and 54b with a normally closed switch 35' in each lead. A ring voltage line A' parallels each lead 54a and 54b and a lead 33', having a normally open switch 34', extends from the ring voltage line A' to a lead 30'. The switches 34' and 35' of each group are operated by one of the four relays P1, P3, P5 and P7 which connect between a ground wire and a lead 54a or 54b.

In addition, in association with each group, a lead 215 is connected at each line 54a and 54b to extend to a continuation of the lead 30' to include in sequence, a normally closed switch 216, a lead 30'' to an even numbered telephone extension; a normally open switch 217; the connection with lead 30'; a normally closed switch 218; and, lead 30'' to an odd numbered telephone.

The switches 216, 217 and 218 operate whenever relay P2 is energized, although through a booster relay hereinafter described. Accordingly, operation to effect extension selection depends first upon energizing one of the relays P1, P3, P5 or P7 to throw switches 34 and 35, and to ring the proper odd numbered extension since the switch 217 is open. However, the simultaneous energization of the relay P2 throws switches 216, 217 and 218 to direct the ringing voltage to the proper even numbered lead.

A supplementary control circuit loop 220 is provided at this remote board 55. Power is provided by a transformer 203' receiving an alternating current potential. Diodes 204 are arranged as a full wave rectifier, capacitors 205' and resistor 206' are provided to smooth the current flow and a zener diode 207' is provided to control the voltage. A lead 221, branched to include four normally open switches 222 parallel, is connected to the base of a transistor 223. This transistor 223 will be turned off whenever a switch 222 is closed by a relay P1, P3, P5 or P7. The emitter of the transistor connects with a lead 224 to the base of transistor 225. A capacitor 226 in this lead 224 is charged to provide a time delay which prevents transistor 225 from turning off until shortly before the ring cycle created by the ring signal generator is terminated. The collector of that transistor is connected to a lead 227 which is branched to include four normally open switches 228 in parallel, each of which is closed by a relay P1, P3, P5 or P7. This lead also includes a relay 229 which functions to close a normally open ringing switch 230 on the ring voltage line A'.

Other circuits in the power supply include a lead 231 having relays 232 and 233 and a normally open switch 234. Switch 234 closes responsive to relay P2 and energizes relays 232 and 233 to operate switches 216 and 217 and permit ringing of an even numbered extension.

A lead 235 includes an exclusion relay E' adapted to operate by closing a switch 31' at an extension to open two exclusion switches 32' in the lines 54a and 54b. To use the two relays K9 and K10, not needed for the wire line extension to relay panel 55, the relay panel 53 includes other carrier drop leads D which parallel ring voltage leads A. Each extension, 9 and 10, is connected to each carrier drop by a lead 30 having therein a normally closed switch 35 and each lead 30 is connected to a ringing voltage lead A by a lead 33 having therein a normally open switch 34. A relay K9 or K10 will energize in a cyclic manner to open the switches 35 and close switches 34 to place a ringing voltage on the extension as heretofore described. Also, the ring voltage leads A will connect with carrier ringback leads B' having normally open switches 37 which will close when a relay B is energized as heretofore described. Also, one lead A will include a normally open switch 37 protected by an RC-arc suppressor shunt 200. This switch closes when the relay B is energized to apply ringing voltage to the system. As such, this arrangement of leads is similar to that heretofore described and may be the same as that described in connection with the relay panel 52.

AUXILIARY TIMER 60

Referring to FIG. 5, it has heretofore been noted that the interlock 59 is operable whenever a local phone at one of the extensions is lifted to make an outgoing call and to seize the circuit to prevent an incoming caller from using the dialing system. This interlock 59 may be connected with an auxiliary timer 60 by a jumper 61. The timer holds circuits open to permit the receiving party at the other end of the line to answer the call. The timer is not required where a party line of three or more carrier circuits is used or where two carrier circuits are used if the bridging panel F is used as hereinafter described, and accordingly, when not needed, the jumper 61 may be disconnected.

Referring to FIG. 6, a local seizure activates relay L as to open switch 42 of lead 43 and to place a "1" level potential at gate 110, the potential of the output lead 111 changes to "0" at gate 77 to prevent an incoming caller from dialing the system as heretofore described. At the same time, the S relay is energized through the action of driver transistor 133. This S relay, located in the carrier C, closes the normally open switch 47 in a lead 48 extending to the base of a transistor 242 of the auxiliary timer 60. The collector of the transistor 242 connects with the base of a transistor 243 by a lead 244. A capacitor 245 is connected between this lead 244 and ground. The collector of transistor 243 connects with the base of a transistor 246 by a lead 247. The collector of transistor 246 is connected to lead 115 through jumper 61 to complete the timer circuit. In the idle state, before relay S is energized, transistor 242 is off, transistor 243 is on and transistor 246 is off, with a "1" level potential on lead 115 to that input of gate 113. Whenever the relay S is energized, the transistors change their state and when transistor 246 turns on, the potential in lead 115 drops to "0" to close the gate 113. This assures a potential level of "1" at lead 112 to gate 110 thereby assuring a continued seizure of the S relay regardless of the potential changes on timer 70 due to seizure by a remote phone. When the local seizure is released through line 43, transistor 242 again turns off, but capacitor 245 commences to charge and, in a time period such as 120 milliseconds, to then turn transistor 246 off and to revert the output to its original state with a charge of "1" upon lead 115. The selected time delay is such that the system will not respond to the dialing pulses by the local station when making an outgoing call.

BRIDGING PANEL F

The circuits of the bridging panel F, indicated at FIG. 3, are shown at FIGS. 11 and 12. The panel F, located in connection with the carrier C′, is used with a party line having a plurality of stations with individual carriers C connected to the single carrier C′. When an extension on one station dials an extension within the system on another station, it is undesirable to extend the signals, the dial pulses, to the Telco or PBX-control J at the remote end of the carrier drop D′. This requires, in association with the bridging panel F, the use of a control dial digit, and a suitable control is the 10-pulse "0" dial digit. The bridging panel F thus permits dialing signals to be extended from a station extension to the central Telco or PBX-control for a call outgoing from the system whenever a "0" digit is first dialed, but whenever any other digit is dialed it is directed to an extension at another station within the system.

Referring to FIG. 11, the bridging panel F, associated with carrier C′, is operated by an outgoing call through action of a relay R*x* from the carrier C′, that is, it operates whenever an extension telephone within the system is picked up and dialing commences. Accordingly, this relay, functioning responsive to the send relay S in the first digit pulse selector 50 heretofore described, is similar to, but oppositely directed from the relay R heretofore described, which responds to incoming calls.

An incoming call from a Telco control J is received by this bridging board through a relay 250 to close a normally open switch 251 of a lead 252 to lock circuits within the panel and to extend its signals, that is dial pulses, through the system which is associated with the relay R heretofore described. An outgoing call to the Telco on the other hand, will lock circuits within the panel to send signals to the Telco J as through a lead 253 which may have a control relay S*x* associated with the Telco. Also, an outgoing call to the Telco, will energize a lead 254 of a driver to function, in connection with a relay S*y*, to prevent the central station or Telco from seizing the circuit after an outgoing seizure closes switch 38*x*. Also, an outgoing call will initiate operation of a dial tone generator G connected to the carrier drop D′. This dial tone generator is not described further since it is essentially conventional.

The bridging panel F includes timers, latches and a decoder in an arrangement similar to the circuitry of the first digit pulse selector 50 although only a single gate is used at the decoder to respond to only the 10 pulses of a dial digit "0". Referring to FIG. 12, whenever an outgoing call seizes the system, it actuates relay R*x* to close switch 38*x* in lead 39*x* and thus places a charge on a timer 70*x* and a Schmitt trigger 92*x*. The timer 70*x* is the same as timer 70 heretofore described, including transistors 71*x* and 73*x* connected by lead 72*x* and with resistor 74*x* in that lead and capacitor 75*x* between the lead and ground. When switch 38*x* closes, the timer changes state and moves the reset level from the resettable devices with which it is associated. The lead 76*x* from this timer includes a branch 76*x*′ which connects with one input of a 3-input gate 255. The other inputs of this gate are normally at a "1" potential level and thus, when the level of lead 76*x*′ is changed from "0" to "1", the output of lead 256 of this gate 255 is changed from "1" to "0". An inverter 257 in lead 256 then changes the output from "0" to "1" in the lead continuation 256′ which connects with the base of a driver transistor 258, whose output lead 259 operates the dial tone generator on the carrier.

The lead 76*x* from the timer connects to an inverter 260 and the lead 79*x* extends through an inverter 80*x* and the extension 79*ax* branches as leads 79*bx* to form reset connections with the flip-flops 102*x* arranged in tandem to form a counter. The output circuits 103*x* of these flip-flops are arranged to connect with a gate 104*x* which opens only whenever 10 pulses, the "0" dial digit, are dialed into the flip-flop counter.

The Schmitt trigger 92*x*, formed with transistors 101*x* in a cascaded arrangement which shapes the pulses received through lead 39*x*, includes an output lead 93*x* to inverter 94*x* and the lead continuation 93*x*′ connects to one input of a 2-input gate 87*x*. The other input of gate 87*x* connects to a lead 86*x* of a timer 85*x*. The output of gate 87*x* is connected to a lead 89*x* which connects with the first flip-flop 102*x* of the counter.

A latch 81*x*, gate 83*x* and timer 85*x* are used to lock out the counter once the first dial digit pulse train moves through the counter. The latch 81*x* has one input connected with lead 79*ax* to set the same whenever the switch 38*x* is closed by relay R*x*. The other input is connected with a lead 88*x* which connects with an output lead 103*x* of the first flip-flop 102*x*. When the first pulse of the digit pulse train is received, this lead 88*x* trips the latch and places a "1" potential on a lead 82*x* to gate 83*x*. Another lead 89*x*′, branching from lead 89*x*, connects with the gate 83*x* to pass the digit pulse train through the gate and to the timer 85*x*.

The timer 85*x*, connected to the output lead 84*x* of gate 83*x* and consisting of transistors 71*x*′ and 73*x*′ connected by lead 72*x*′ and resistor 74*x*′, is in this lead, and a capacitor 75*x*′ is between the lead and ground. This timer will not function until the end of the digit pulse train is completed. Its output lead 86*x*, initially at a "1" level then changes to a "0" level to lock gate 87*x* and prevent any additional dial digit pulses from passing through the counter until the entire system is reset by opening switch 38. A branch lead 86*x*′ to gate 255 is also changed to a "0" state and turns off the driver lead 259 of the dial tone generator heretofore described.

At the time a seizure is effected by the closing of switch 38*x*, a relay S*x* in the Telco equipment is energized through a driver from whence the lead 253 to the Telco extends. This is effected through a lead 261 from lead 93*x* of the Schmitt trigger, and extending to one input of a gate 262, whose output lead 263 connects with one input of a latch 264. The other input of the latch is held at a "1" as hereinafter explained, while the lead 265 of the latch at the side corresponding to lead input 263 is the output of an inverter 266 which is connected to a lead 267 extending from lead 79*x*. Seizure of the system thus sets the latch to a "0" potential on its output lead 268. This lead at the input of a gate 269 thus places a "1" potential on the output 270 of the gate to turn on a transistor 271 forming the driver of lead 253.

When a seizure occurs by closing switch 38*x*, it is essential that a subsequent seizure does not occur from the Telco equipment by energizing the relay S*y*. Lead 267′, a branch of lead 267, from lead 79*x*, extends to an input of gate 272. Seizure of the system by closing the switch 38*x* places a "0" potential at this input 267′. The potential on the output lead 273 of gate 272 is thus at a "1" level and an inverter 274 changes the output of the extension lead 273′ to a "0" level. This turns off the driver transistor 275 preventing current from flowing through the lead 254 and energizing the relay S*y*.

The output of the gate 104*x* of the counter after the first digit pulse train will be at a "0" potential if a "0" digit is dialed, but will be at a "1" potential if any other digit is dialed. Through this arrangement circuits are provided to permit the digit pulses of continued dialing to be directed through output 253 to the Telco equipment if a "0" digit is initially dialed. However, if another digit is dialed to place a "1" potential on the output of gate 104*x*, the circuit 253 to the Telco equipment will remain energized but further dialing will not be received by the Telco equipment.

The output lead 276 of gate 104*x* extends through a timer 277 whose output 278 extends to the input of a gate 279. The timer components includes the lead 276 which extends to the base of transistor 280. A lead 281 from the collector of this transistor includes a resistor 282 and a capacitor 283 between it and ground and extends to the base of a transistor 284. A lead 285 from the collector of transistor 284 extends to the base of a transistor 286.

The timer output 278 extends from the collector of this transistor 286 to the input of the gate 279. A lead 287 connected with the lead 93x' of the Schmitt trigger extends to an inverter 288 and its continuation 287' also extends to the other input of gate 279. The output 289 of gate 279 connects to the input of gate 269, the other input being from latch 268 and an extension 289' connects with an input of the latch. With this arrangement, whenever the output potential on the output gate 104x of the counter is a "1", the potential on lead 278 is a "0" and this gate will thus remain closed unless the output of gate 104x is changed to a "0" by dialing a 10-pulse "0" dial digit. Then, after a suitable interval established by the timer capacitor 283, the potential of lead 278 will be "1". Likewise, the potential of lead 287' from the Schmitt trigger will be "1" while the system is seized and subsequent dial pulse trains may pass through this gate, through gate 269 and to the lead 270 to transistor 271 and to the extension lead 253.

In association with this circuit, another circuit is provided to hold the latch 264 in a properly set position to pass the pulses. A lead 290 extends from a connection with lead 285 in the timer to extend to gate 262. Whenever the potential at the output of gate 104x is at a "1" level, the lead 290 is also at a "1" level so that gate 262 will be initially operated by lead 261. Whenever the potential on lead 290 drops to a "0", as when the output of gate 104x is changed, the lead 263 to the latch will continue to hold the latch in its set position so that the dial pulses may pass through the system.

Whenever a call is originated from the Telco, a switch 251 in lead 252 is closed. This leads is connected to the base of a transistor 291 and a lead 292 from the collector of that transistor is changed from a "1" level to a "0" level. Lead 292 extends through an inverter 293 to the input of the gate 272. Accordingly, the potential on lead 292' is normally a "1" and the gate 272 will normally be operated by changing potential of lead 267. However, whenever the switch 251 is closed by a seizure at the Telco, the potential at lead 292 becomes "0" which functions to actuate the driver 275 connected through the components extending from gate 272 as heretofore described. Also, a lead 292' branches from lead 292 to extend to an input of gate 255 controlling the dial tone generator. This lead 292 is at a "1" level potential whenever switch 251 is open and will not normally affect operation of gate 255. However, the closing of the switch 251 will place a "0" potential on the input of gate 255 to prevent operation of the dial tone generator.

We have now described a preferred embodiment of our invention in considerable detail. The invention is further defined by the appended claims as follows.

We claim:

1. A selective ringing apparatus for a multiextension point to point line or party line telephone system with a plurality of telephones of the multiextension system being connected by extension leads to a single carrier circuit which is connected to a common communication circuit, wherein seizure and dial pulse signals are received and these signals are transmitted to the selective ringing apparatus by a relay with the selection of a telephone by the apparatus being obtained by operation of the relay, said selective ringing apparatus including in combination therewith:

a. an input lead having a normally open switch which closes when the aforesaid relay is energized, said input lead having a potential at a first level when the apparatus is idle and the switch is open and a potential at a second level when the switch is closed, said potential shifting momentarily to the first level whenever the relay is momentarily deenergized responsive to each dial pulse;

b. a holding gate means associated with the input lead adapted to shift and to hold the apparatus in a seized state whenever the input lead potential is at the aforesaid second level, said holding gate means including timer means to continue to hold the apparatus in a seized state during the aforesaid momentary changes of level in the input lead potential responsive to dial pulses;

c. a pulse-receiving gate means associated with the input lead adapted to change state whenever seizure occurs and to then respond to momentary changes of level of the input lead potential and to pass shaped pulses into a selector means;

d. a selector means including a binary counter and a plurality of distributor gates associated therewith, one for each of the number of pulses which can occur in the dial digit pulse train, said selector means being adapted to then receive shaped pulses from the aforesaid pulsing gate means after seizure by the holding gate means to change the state of the output of a selected distributor gate which corresponds to a predetermined number of pulses of the dial digit;

e. a locking means adapted to lock the selector means at the end of the train of dial digit pulses whereby to maintain and hold the aforesaid change of state at the output of said selected distributor gate;

f. a ringing means, including a cut-in relay for each of the plurality of telephone extensions having a normally open switch connecting with the extension wire thereof, and being adapted to ring the extension whenever the switch is closed by energizing the relay; and g. a lead means extending from the output of each distributor gate to the cut-in relay of a selected telephone extension to energize the relay whenever the output at the distributor gate is held by the locking means to thereby close the relay switch and permit the selected telephone extension to ring.

2. A selector for a selective ringing apparatus for a multiextension point to point or party line telephone system with a plurality of telephones of the system being connected by extension leads to a single carrier circuit which is connected to a common communications circuit wherein seizure and dial pulses are received and these signals are transmitted to the apparatus by a relay with the selection of a telephone by the apparatus being obtained by pulsing operation of the relay to effect a seizure of the apparatus and a sequence of a first and a second dial digit pulse train from the central control and through the relay, including:

a. an input lead having a normally open switch which closes when the aforesaid relay is energized, said input lead having a potential at a first level when the apparatus is idle and the switch is open and a potential at a second level when the relay is energized and the switch is closed, said potential shifting momentarily to the first level whenever the relay is momentarily deenergized responsive to each dial digit pulse;

b. holding gate means associated with the input lead adapted to shift and hold the apparatus in a seized state whenever the input lead is at the aforesaid second level, said holding gate means including timer means adapted to hold said selector portions in a seized state during the aforesaid momentary changes of level in the input lead potential responsive to dial digit pulses;

c. pulse-receiving gate means associated with the input lead adapted to change state whenever seizure occurs and to then respond to momentary changes of level of the dial digit pulses formed by potential changes and to pass shaped pulses into a selector means;

d. first selector mean including a binary counter and a plurality of distributor gates associated therewith, one for each number of pulses which may occur in the first dial digit pulse train, adapted to receive the shaped pulses from the first dial digit through the aforesaid pulsing gate means after seizure by the holding gate means and to change the state of the output of a selected distributor gate which corresponds to a predetermined number of pulses of the first dial digit;

e. a first locking means including a timing means adapted to lock the first selector means at the end of the first dial digit train of shaped pulses, whereby to maintain and hold the aforesaid change of state at the output of the said selected distributor gate;

f. a plurality of second selector means, each including a binary counter and a plurality of distributor gates, with one selector means being connected with the output of each distributor gate of the said first selector means, each said second selector means including a gating means adapted to receive the shaped pulses whenever the aforesaid distributor gate to which it is connected is held in said changed state by the aforesaid locking means, each said second selector means including a plurality of second distributor gates, one for each number of pulses which may occur in the second dial digit pulse train, and said second selector means being adapted to receive the shaped pulses of the second dial digit through the aforesaid pulsing gate means and to change the state of the output of a selected second distributor gate which corresponds to a predetermined number of pulses of the second dial digit;

g. a second locking means adapted to lock the second selector means at the end of the second train of the dial digit pulses, whereby to maintain and hold the aforesaid change of state at the output of the said selected second distributor gate;

h. ringing means including a cut-in relay for each of the plurality of telephone extensions having a normally open switch connecting with the extension wire thereof, and being adapted to ring the extension whenever the switch is closed by energizing the relay; and i. a lead means extending from the output of each second distributor gate to the cut-in relay of a selected telephone extension to energize the relay whenever the output at the second distributor gate is held in said changed state by the second locking means, to thereby close the relay switch and permit the selected telephone extension to ring.

3. In the apparatus defined in claim 2, wherein said pulsing gate means includes a Schmitt trigger adapted to shape the pulses to a substantially square form before permitting the same to be directed into the apparatus.

4. In the apparatus defined in claim 2, wherein:

said first selector means includes a binary counter having a zeroing input connecting with the holding gate means; a counting input connecting with the pulsing gate means, and a plurality of outputs connecting with the inputs of the said distributor gates;

said first locking means includes a latch adapted to be set to a first state when the holding gate means shifts to a seized state and to thereafter unlatch, for locking of the first selector mean hen the pulses of the first dial digit pass through the apparatus; and a timer adapted to delay said locking action until the first digit pulse train is completed.

5. In the apparatus defined in claim 2, wherein:

said second selector means includes a binary counter having a zeroing input connecting with the holding gate means; a counting input connecting with said pulsing gate means; and a plurality of outputs connecting with the inputs of the said distributor gates; and said second locking means includes a latch adapted to be set to a first state when the holding gate means shifts to a seized state and to unlatch for locking the second selector means when the pulses of the second dial digit pass through the apparatus; and a timer adapted to delay the locking action until the second digit pulse train is completed.

6. In the apparatus defined in claim 2, wherein said ringing means includes ring voltage leads paralleling the carrier drop;

a pulser timed to selected intervals of "on ring" and "off ring" and a circuit lead extending therefrom;

a transistor drive is controlled by the output of each second distributor gate and connects with the aforesaid circuit lead, each said transistor drive connecting with a relay to energize it when the respective second distributor gate is held by the second locking means; and switches connect said selected telephone extension with the carrier drop and with the ring voltage leads which open and close responsive to energization of said relay to disconnect the carrier drop and to connect the ring voltage lead during the "on ring" cycle.

7. In the apparatus defined in claim 2, including a gate in the aforesaid holding gate means;

a cutout lead to said gate having a potential at a first level adapted to permit signals to pass through the gate from the said input lead; and means responsive to lifting of a telephone of a local extension to change the potential of said cutout lead to thereby lock the gate and accordingly, prevent a seizure by the central control whenever the local extension telephone is being used.

8. In the apparatus defined in claim 7, including a gate means in the said cutout lead;

a control lead to said gate means having a potential at a first level adapted to hold the gate means open to permit the cutout lead to change its level; and means responsive to seizure by the central control adapted to close the gate means, whereby to prevent seizure by a local extension whenever seizure by the central control occurs first.

9. In the apparatus defined in claim 2, wherein:

said holding gate means includes a gate and a cutout lead to the gate input, said gate being open to permit seizure of the apparatus by the central control through the holding gate means when the potential on the cutout lead is at a first level, and being locked to prevent seizure by the central control when the potential on the lead is at a second level;

a cutout gate in the cutout lead which, when locked, holds the output of the cutout lead at the said first level;

a lead to a first input of the cutout gate which is normally at a level adapted to lock the gate, but changes level to unlock the cutout gate responsive to seizure by a local telephone extension, to thereby change the cutout lead level and to prevent seizure by the central control; and a timer means adapted to be actuated by seizure of a local telephone extension having a lead to a second input of the cutout gate which is normally at a level adapted to permit the gate to unlock by change of the level of the aforesaid first input lead whenever a local telephone extension seizes the system, but to change the level of the second input lead after a selected time interval after local seizure to lock the gate and thereafter return the potential on the cutout lead to its aforesaid first level to permit seizure by the central control.

10. In the apparatus defined in claim 9, including a warning means connected with the said timer lead adapted to actuate to provide an alarm whenever the timer lead changes from its normal level to a gate-locking level.

11. In the apparatus defined in claim 9, including:

a lead to a third input to the said cutout gate which is at a level adapted to normally permit the cutout gate to unlock by change of the level of the first input lead whenever a local telephone seizes the system, and means associated with the holding gate means adapted to change the level of the third input lead responsive to seizure by the central control, whereby to lock the cutout gate and prevent seizure by a local extension telephone.

12. In the apparatus defined in claim 10, including:

a feeder gate in the said third input lead of the cutout gate which, when locked, hold the said third input lead at the cutout gate unlocking level;

a first lead to an input of the feeder gate from the holding gate means which is normally at a level adapted to lock the feeder gate, but to change level to unlock the gate whenever the central station seizes the circuit;

a latch having an output lead to a second input of the feeder gate whose potential level normally permits the gate to be unlocked by the first said lead; and means associated with the aforesaid second locking means adapted to trip the latch at the end of the second digit pulse train whereby to change the level of the second input to lock the feeder gate, thereby permitting a local telephone extension to seize the apparatus when it is lifted to answer a call.

13. In the apparatus defined in claim 2, wherein:

said means extending from the output of each second distributor gate includes a lead and a ring relay therein adapted to be energized by a ring signal applied by the ringing means;

said ringing means includes ring voltage lines paralleling the carrier drop lines;

a lead having a normally closed switch extends from each carrier drop line to one side of each telephone extension;

a lead having a normally open switch extends from each ring voltage line to one side of each telephone extension; and wherein said ring relay is adapted to open the normally closed switches and close the normally open switches of the leads connecting with its selected telephone extension during the ringing cycle of the telephone.

14. In the organization defined in claim 13, including:

a master switch in a ring voltage line;

a relay adapted to close the aforesaid master switch when it is energized;

a switch means adapted to energize the master relay responsive to the energizing of the ringing means of an extension; and a timer adapted to open the master switch before the ringing means is deenergized.

15. In the apparatus defined in claim 2, wherein:

means extending from the output of each second distributor gate includes a lead and a ring relay therein adapted to be energized by a ring signal applied by the ringing means;

said ringing means includes a carrier drop extending to a group of distant extensions;

direct current power supply lines having positive and negative leads paralleling the carrier drop at the location of the apparatus;

a switch means adapted to disconnect the carrier drop from the central station and to connect the carrier drop leads and ground with said positive and negative leads in various combinations, each combination being associated with and formed by the energization of a selected distributor gate;

receiving relays at the remote extension shunting the carrier drop and ground, including diodes in each shunt to direct the current to selected relays and relay combinations, each combination being associated with and formed by the aforesaid lead connection combinations;

ring voltage lines paralleling the carrier drop lines;

leads from the carrier drop lines to each telephone extension having normally closed switches; and leads from the ring voltage lines to each telephone extension having normally open switches, said switches at a selected telephone extension being operable to be opened and closed responsive to the energization of selected receiving relays.

16. In a multiextension telephone selective ringing apparatus such as defined in claim 2, wherein:

the multiextension system is divided into a plurality of stations with groups of telephone extensions being located at each of the stations wherein the groups are each connected into a common carrier with the carrier drop extending therefrom and to the central control and including in combination therewith:

a bridging apparatus at the carrier adapted to permit the dialing of an extension within the apparatus between different stations without dialing into the central control or dialing from an extension within the apparatus to the central control by dialing a specified dial digit prior to the dialing of the aforesaid sequence of two dial digits, and including:

a. an input lead adapted to change level when seizure of the line by a telephone extension at one station occurs;

b. a holding gate means associated with the input lead adapted to hold the apparatus in a seized state responsive to seizure by the input lead;

c. a pulsing gate means adapted to receive dial pulses from the extension;

d. a selector means adapted to respond to the pulses of the specified dial digit; and e. a seizing means operative responsive to the pulses of a dial digit and to seize the central control responsive to the pulses of the specified dial digit to permit further dialing to be directed into the control panel, but to permit further dialing only within the system responsive to the pulses of any other dial digit.

* * * * *